United States Patent
Fehrenbacher et al.

(10) Patent No.: US 8,416,401 B2
(45) Date of Patent: Apr. 9, 2013

(54) LOCAL DOSIMETER FOR MEASURING THE AMBIENT EQUIVALENT DOSE OF PHOTON RADIATION, AND READING METHOD

(75) Inventors: Georg Fehrenbacher, Muhltal (DE); Johannes Georg Festag, Seeheim-Jungenheim (DE); Sebastian Grosam, Messel (DE); Karsten Vogt, Darmstadt (DE)

(73) Assignee: GSI Helmholtzzentrum fur Schwerionenforschung GmbH (DE)

( * ) Notice: Subject to any disclaimer, the term of this patent is extended or adjusted under 35 U.S.C. 154(b) by 0 days.

(21) Appl. No.: 12/741,990

(22) PCT Filed: Nov. 7, 2008

(86) PCT No.: PCT/EP2008/009416
§ 371 (c)(1),
(2), (4) Date: Aug. 17, 2010

(87) PCT Pub. No.: WO2009/062639
PCT Pub. Date: May 22, 2009

(65) Prior Publication Data
US 2010/0302533 A1    Dec. 2, 2010

(30) Foreign Application Priority Data
Nov. 15, 2007 (DE) .......................... 10 2007 054 927

(51) Int. Cl.
*G11C 7/00* (2006.01)
(52) U.S. Cl.
USPC ...................................................... 356/222
(58) Field of Classification Search ............... None
See application file for complete search history.

(56) References Cited

U.S. PATENT DOCUMENTS 7,208,743 B2 * 4/2007 Luszik-Bhadra et al. .................. 250/390.03
7,485,877 B2 * 2/2009 Kearfott ..................... 250/484.2
7,737,401 B2 * 6/2010 Iwatschenko-Borho et al. ........................ 250/339.02

FOREIGN PATENT DOCUMENTS

| DE | 1489922 | 6/1965 |
| DE | 3903113 | 8/1990 |
| DE | 69711199 | 10/2002 |
| JP | 02112786 | 4/1990 |
| JP | 07311272 | 11/1995 |
| JP | 2000275346 | 10/2000 |

OTHER PUBLICATIONS

The Use of the Monte Carlo Simulation Technique for the Design of an H*(10) Dosemeter Based pm TLD-100 Radiation Protection Dosimetry vol. 101, No. 1-4 pp. 279-282 (2002).
LiF:Mg,Cu,P Based Environmental Dosemeter and Dose Calculation Algorithm Radiation Protection Dosimetry vol. 35, No. 1-4 pp. 273-281 (1999).
Estimation of Ambient Dose Equivalent fromEnviromental Radiation Using a CaSO4:Dy Thermoluminescence Dosemeter Radiation Protection Dosimetry vol. 32, No. 2 pp. 127-130 (1990).
Hranitzky C., et al Prototype Development of a Thermoluminescence Dosimeter Based on Monte Carlo Simulation Methods, Health Physics Div., ARC Siebersdorf Research GmbH, Austria p. 1-9, No Date.
Translated JP Office Action Dated: Sep. 28, 2012 Dispatched: Oct. 4, 2012 Re: Patent App No. 2010-533478.

* cited by examiner

*Primary Examiner* — Tu Nguyen
(74) *Attorney, Agent, or Firm* — Reising Ethington PC

(57) ABSTRACT

An area dosimeter for measuring the ambient equivalent dose of photon radiation with a diffuser, and a detector card with at least one pair of detection elements, preferably LiF-chips. A first of the two detection elements is positioned between two filters in order to spectrally filter the photon radiation. A second of the two detection elements is not positioned between such filters in order that the photon radiation arriving at the second detection element will have a different spectral distribution from the spectrally filtered photon radiation arriving at the first detection element. The two measurement values are used to obtain a weighted sum in order to achieve an optimized response characteristic.

23 Claims, 5 Drawing Sheets

Figure 6:
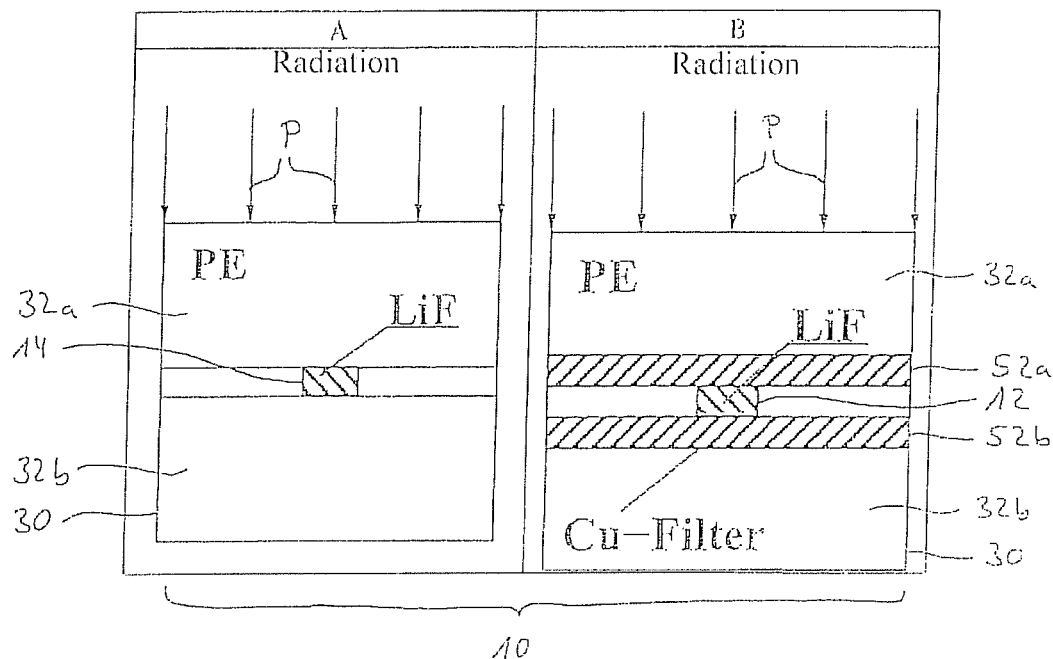

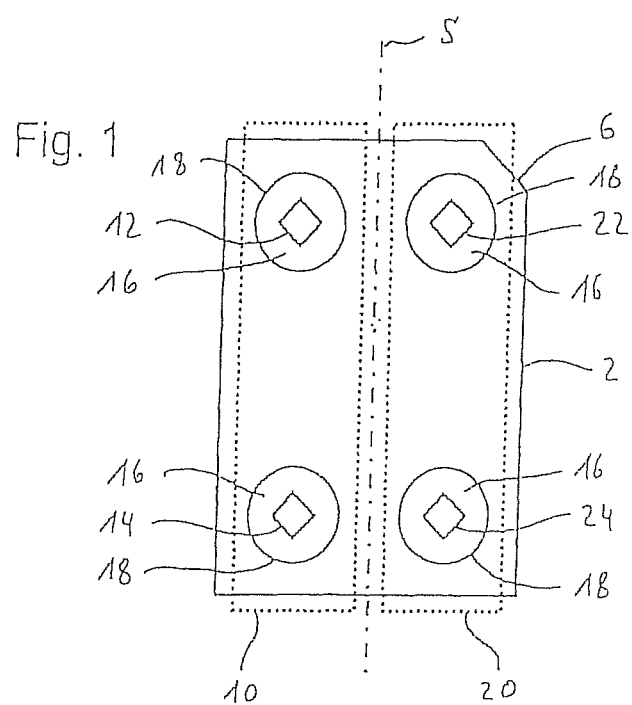
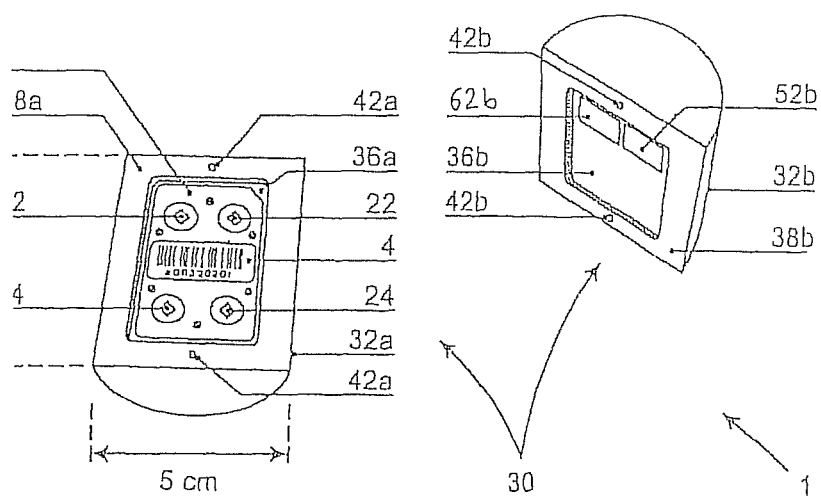

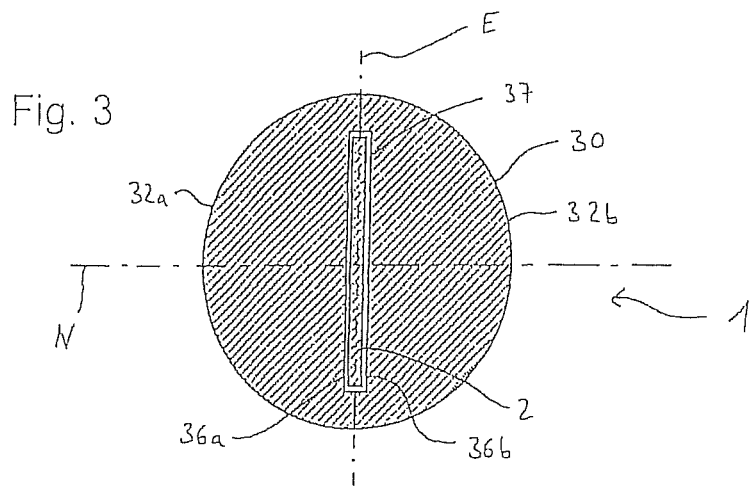
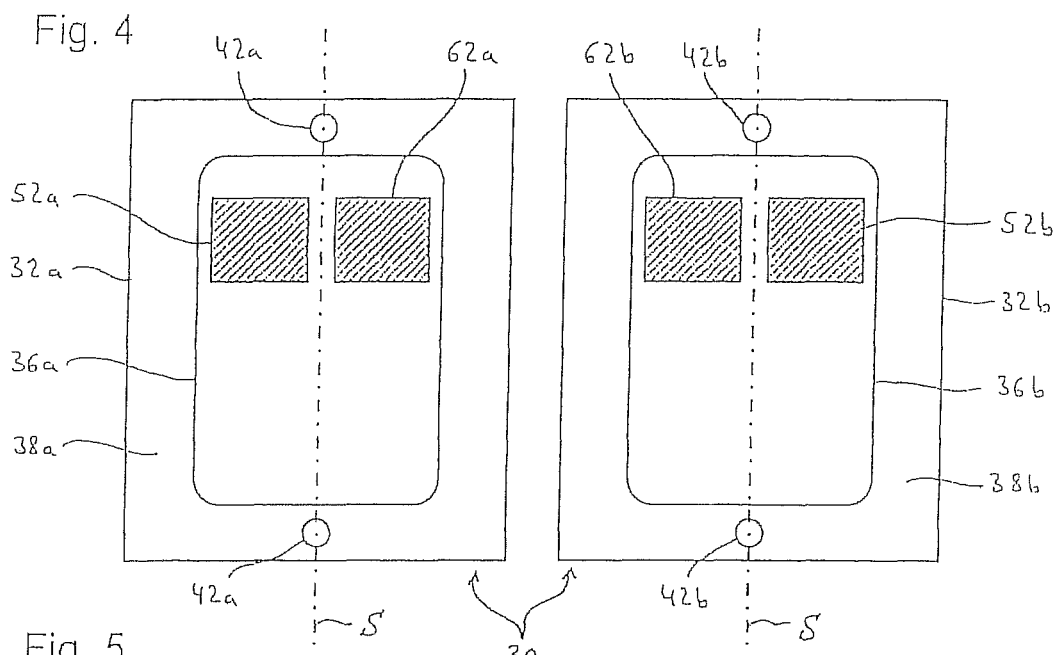
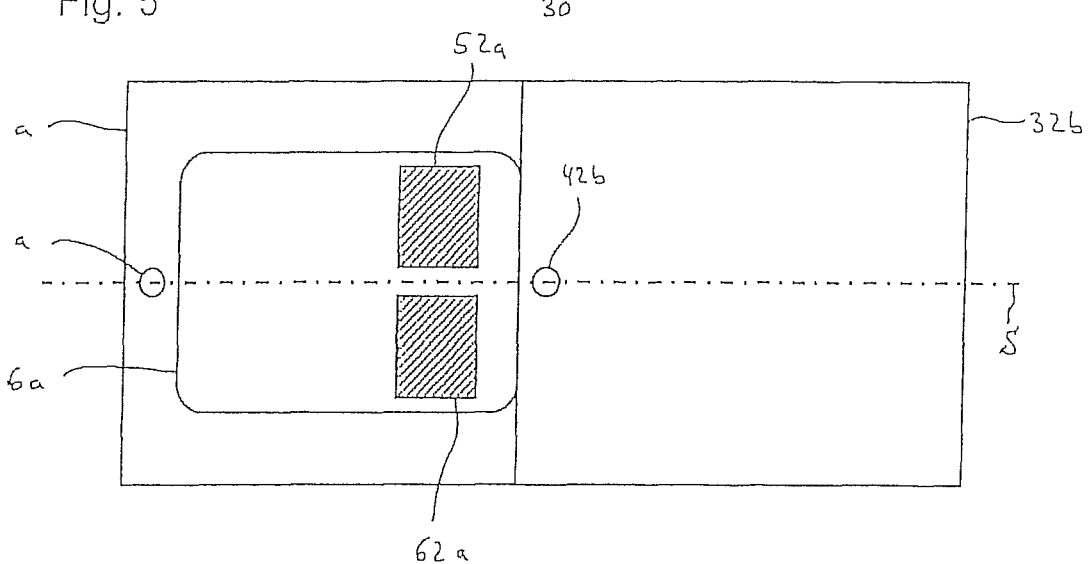

LOCAL DOSIMETER FOR MEASURING THE AMBIENT EQUIVALENT DOSE OF PHOTON RADIATION, AND READING METHOD

FIELD OF THE INVENTION

The invention comprises an area dosimeter for measuring the ambient equivalent dose of photon radiation and a process for making a reading a local dosimeter of said type.

BACKGROUND OF THE INVENTION

In the handling of radioactive substances as well as in operating accelerators, x-ray equipment and sources of stray radiation, radiation protection areas are to be established to provide protection for persons in which for each case specific protection rules apply. This requires a monitoring, i.e. a continuous measuring of the radiation. For this, so-called dosimeters are used.

For radiation monitoring, particularly with accelerators, aside from the measuring of the neutron radiation level, the measuring of photon radiation is also necessary. With the implementation of the new radiation protection regulations and x-ray regulations, new measurements for the area dosage and person dosage are to be used. The dosage rate used until the present of "photon equivalent dose Hx" has been replaced with the dosage rate "ambient equivalent dose H*(10)" for penetrating radiation.

The dosage rate used until the present is based on the dosage generated through radiation in the absence of air; the new dosage rate is defined through the dosage which exists through an identical radiation in 10 mm depth of a standardized test body (ICRU-ball; ICRU: International Commission on Radiation, Units and Measurements). The definition is as follows: The ambient equivalent dose H*(10) at a point of interest in the actual radiation field is the equivalent dose generated in the respective established and expanded radiation field at a 10 mm depth in the ICRU-ball at the radius vector in the opposite direction of the radiation angle of incidence. Both active, i.e. electronic area dosimeters and passive area dosimeters exist. Known active monitors include, for example, scintillation dosimeters, Geiger-Müller counters, proportional counters and ionization chambers.

A dosimeter for low energy x-rays and gamma rays is known of from the DE 697 11 199 T2, whereby, among other things, the ambient equivalent dose H* can be measured. This dosimeter uses a silicon based photodiode and a second diamond based detector, whereby the test signals are electronically processed by current preamplifiers and analog digital converters.

With active monitors such as, for example the type FHZ 600A (distributed by Thermo Electron, Erlangen) the levels of the gamma radiation produced, for example in the experiment hall EH as well as in the area of the experiments conducted on the synchrotron of the Association for Heavy Ion Research mbh [translation of: Gesellschaft für Schwerionenforschung mbh] are recorded. Active monitors have the disadvantage that they are complicated and expensive, and require a power source or regular replacement of the batteries. Furthermore, they may be overloaded by short powerful radiation pulses, which may occur, in particular, with pulse driven accelerators, which may result in a corruption of the monitoring results. As a result, passive dosimeters are used, ideally, for the measurement of pulsed x-rays and gamma rays.

A process for measurement of radiation dosage which is for the most part less than 45 keV is known of from the DE 1 489 922. With this process two phosphate glass measurement elements with differing casings are used to record a measurement through subtraction which is not affected by energy. Furthermore, radiation between 40-80 keV is not taken into account as these values are cancelled out through the subtraction process.

Passive area dosimeters typically contain a passive detection element, whereby said elements absorb and store the incident radiation in a physical process without the necessity of electrical current. Thermoluminescent detectors (TLD) are a typical example of this. Thermoluminescent detectors contain, for example, lithium fluoride crystals of the isotope $^6$LiF or $^7$LiF, whereby although the response characteristics of $^6$LiF and $^7$LiF for neutron radiation are different, they have the same response characteristics for photon radiation. Thermoluminescent detectors of this sort are available, for example, from the company Thermo Electron GmbH. Four $^7$LiF crystals may be, for example, applied to a thermoluminescent detector card. The irradiated detector cards are evaluated in a machine. In a heating process, the light emitted from the TLD is detected using photomultipliers, and a so-called glow curve is recorded. The dosage is determined by means of the measured glow curves.

A dosimeter with a dosimeter card having the aforementioned lithium fluoride crystals is known of from the DE 39 03 113 A1. In this case however, it is not dealing with an area dosimeter, but rather a personal dosimeter and thereby mainly with the design of the detector card. This is to be constructed in the shape of a square, in order to enlarge the distance between the crystals.

H*(10) area dosimeters are known of from Siebersdorf Research which contain an aluminum dosimeter card with four lithium fluoride chips. The dosimeter cards are laminated in a composite plastics film to protect said from contamination and are inserted from above through an opening in a plastic cylinder.

Subsequently, the dosimeter is sealed with a powder coated aluminum protection cap, to be placed or hung at the measuring location, for measurement during a three-month measuring period.

The disadvantage with these area dosimeters is, firstly, that the response capacity of the thermoluminescent detectors displays a strong dependence on energy. The measuring rate is predefined through legal regulations, such as the German radiation protection regulation (see: regulation for the protection from damage by ionizing radiation (radiation protection regulation—Strahlenschutzverordnung—StrlSchV) of Jul. 20, 2001), with the aforementioned measuring rate H*(10), which is to be measured by an ambient dose equivalent dosimeter.

The energy dependency for pure thermoluminescent crystals however is only similar to the measurement rate H*(10) within an energy range of circa 100 keV-1 MeV. Despite the plastic cylinder, the H*(10) area dosimeter of Siebersdorf Research is also provided with an energy utility range of only 30 keV-1.3 MeV. Particularly problematic for many areas of application is the faulty precision in the range between 10 keV and 30 keV. In general, a measurement range of 10 keV-3 MeV, or preferably, up to 10 MeV, is desirable.

Aside from this, it is questionable whether these area dosimeters have a sufficient measurement precision over the full range of 360°. It is not certain, for example, that an area dosimeter which has sufficient measurement precision at an angle of 0° for a specific energy interval also has the same precision, for example, at an angle of 75°.

Overall, there is a need for improvement regarding the existing area dosimeters.

GENERAL DESCRIPTION OF THE INVENTION

The invention therefore has assumed the basic task of providing an area dosimeter and a reading process which enables a precise measurement of the ambient equivalent dose, as well as with pulsed photon radiation.

A specific task of the invention is to provide an area dosimeter and a read-out process which can depict a spectral response characteristic for photon radiation, whereby a predefined standard function for a relative dosage display is as precise as possible for the spectral range to be tested which is as large as possible.

Another specific task of the invention is to provide an H*(10) area dosimeter which allows for a precise measurement of the ambient equivalent dose in the energy range below 100 keV, in particular from 10 keV-30 keV, but also, when applicable, additionally in the energy range above 1.3 MeV to approximately 3 MeV or even up to 10 MeV.

Another task of the invention is to provide an H*(10) area dosimeter which allows for as much precision as possible within the desired energy range independent of the direction.

The task of the invention shall be accomplished with the objects of the independent claims. Advantageous enhancements of the invention are defined in the subsidiary claims.

In accordance with the invention, a passive, non-electronic area dosimeter for measuring ambient equivalent dosages H*(10) of photon radiation shall be provided. The ambient equivalent dose shall be measured throughout 360°, or respectively, when applicable, covering an area of $4\pi$ independent of the direction to the greatest extent possible. The applicable range of the area dosimeter contains x-rays and gamma rays in intervals from ideally at least 10 keV to more than 1 MeV, particularly ideally up to 3 MeV or even up to 10 MeV.

The area dosimeter contains a diffuser for the photon radiation and a detector card with at least one first pair of photon radiation sensitive passive detection elements, in particular two thermoluminescent detector chips, e.g. two lithium fluoride chips (LiF-chips). Other thermoluminescent materials may also be used however. The two detection elements both have the same response characteristics for the photon radiation to be measured. Ideally, both detection elements are identical, although it is also conceivable that one $^6$LiF-chip and one $^7$LiF-chip be used, as these have the same response characteristic for the photon radiation to be measured.

Ideally, the detection elements, in the form of LiF-chips are glued in each case to a thin plastic film and then hung by the plastic film in the window of an aluminum frame in the detector card. The LiF-chips may however, depending on the manufacturer of the detector card, also be laminated between two plastic films. The LiF-chips are, for example, approximately 3 mm×3 mm in size, with a thickness of approximately 0.5 mm. Detector cards of this sort are available commercially, for example, from Thermo Electron GmbH. The detector cards display a card surface in which the two detection elements are arranged next to each other, or above one another, exactly in the window of the detector card. The configuration of the diffuser and the detection elements is basically mirror symmetric on the card surface, such that the two detection elements for photon radiation are sensitive in the same manner from both sides of the card surface, in order that the greatest degree of directional independency for measurement of the photon radiation in the full range of 360° may be obtained. In particular, the response characteristic for radiation, both from the front and the back in relation to the detector card which arrives at the detection element, is as identical as possible. A certain directional dependence in respect to the angle of incidence to the normal card surface, e.g. perpendicular to the card surface in comparison with an angle of 75° to the standard, is basically undesirable, but unavoidable. This directional dependency can, however, be kept to a minimum by the invention.

In accordance with the invention, the first of the two detection elements is positioned between two filters, such that the photon radiation arriving at the first detection element is filtered from either the one (anterior) or the other (posterior) filter, depending on whether the photon radiation arrives at the first detection element from the front or the back, whereby the two filters are identical in respect to their spectral filtering effect, in order that photon radiation be subjected to the same spectral filtering from the front or from the back. Spectral filtering, in the sense of the invention, is understood to mean that the filtering effect is a function of the energy, i.e. depending on the energy, the radiation is filtered differently. The spectral filters are particularly effective in suppressing photon radiation in the energy range below 30 keV in comparison to higher energies, particularly between 100 keV and 1 MeV, and have, thereby, in the desired measurement range a significant and desired spectral filtering effect on the photon radiation in the measurement interval to be tested, and are not to be confused with the standard mounting films for the LiF-chips. The filters alter in a targeted manner the photon spectrum, reducing the lower energies of less than 30 keV. On the other hand, the filters may not be selected such that they absorb too strongly to allow for the passage of a sufficient intensity of the photon radiation for the measurement.

It is important that only one of the two detection elements is located between the aforesaid filters. This means that the second of the two detection elements is not located between such filters in the manner that the first detection element is, in order that the photon radiation arriving at the second detection element displays a spectral distribution which is different from the photon radiation arriving at the first detection element. In particular, the spectral distribution of the photon radiation arriving at the first detection element is reduced in the range between 10 keV and 30 keV in relation to higher energies, but ideally still present in measurable quantities.

It is clear that the invention may be realized using a variety of filters on both detection elements, and this possibility should not be excluded. It is important that the photon radiation which arrives at the first detection element is filtered differently than the photon radiation arriving at the second detection element, whereby this difference however, is independent of whether the radiation arrives at the detection element from the front or the back. In the simplest case, there are therefore no filters on the second detection element (not to be confused with the mounting films), such that the photon radiation arriving at the second detection element remains unfiltered within the diffuser.

Because the second detection element is not between filters such as those with the first detection element, this means accordingly that the second detection element either 1) is not between filters, or 2) is between filters with a significantly different spectral filter effect on the photon radiation to be measured that that of the first detection element.

Advantageously, it is thereby possible with a very simple construction of an area dosimeter to intentionally alter the spectral response characteristic by forming a weighted sum of the two measurement values of the two detection elements. This is possible because the detection elements measure radiation dosages with different spectral distributions due to the difference in filtering. In this manner, the energy dependency of the measurement for the measurement rate H*(10)

can be depicted as precisely as possible over an energy interval which is as large as possible.

In accordance with a preferred design version of the invention, the area dosimeter contains a second pair of photon radiation sensitive detection elements. This second pair is ideally identical to the first pair and contains also anterior and posterior filters on one of the two detection elements, as is the case for the first pair. In this manner, the first of the two detection elements of the second pair is positioned between two filters in order that the photon radiation arriving at the second pair is filtered by one of the two filters, depending on whether the photon radiation is arriving at the first detection element of the second pair from the front or back, whereby the two filters of the first detection element of the second pair are identical in respect to their spectral filtering effect, such that the same spectral filtering effect is obtained for photon radiation from the front or the back. Furthermore, the filters of the first detection element of the second pair and the filters of the first detection element of the first pair are identical in respect to their spectral filtering effect. In addition, the second of the two detection elements of the second pair is not between such filters as the first detection element of the second pair, such that the photon radiation arriving at the second detection element of the second pair displays a different spectral distribution, i.e. unfiltered or, if applicable, filtered differently, than the spectrally filtered photon radiation arriving at the first detection element of the second pair.

The advantage of having a doubled arrangement is based on the fact that with two identically structured detection pairs both the dosimeter values of each of the first detection elements of both pairs may be determined as well as the dosimeter values of each of the second detection elements of both pairs, and then the weighted sum can be determined from both of the measurement values provided. At first glance this may seem simple, but it has a particular advantage with the conventionally used detector cards in respect to the directional independency of the measurement. The four detection elements are specifically, ideally, arranged in a rectangular configuration on the card, and in such a manner that the first detection element of the first pair and the second detection element of the second pair face each other diagonally. In other words, the two pairs are positioned parallel next to each other and the two detection elements of each pair are located one below the other on the detector card. Furthermore, the diffuser is for the most part ideally cylindrically symmetric and the rotation symmetry axis of the diffuser runs between the two pairs, i.e. both between the two first detection elements as well as between the two second detection elements. This means that the two pairs in each case (mirror symmetrically) are neighboring the symmetry axis. The detector card breaks the cylindrical symmetry of the dosimeter due to its flat shape and introduces thereby a generally undesired directional dependency into the system. The directional dependency caused thereby can however be reduced to a minimum through the averaging between the two identically constructed pairs on each side of the symmetry axis, as has been proven experimentally. For this purpose, the fact can be used, that the path of the photon radiation, which is at an angle diagonal to the card standard through the diffuser to the two pairs is different, such that the pairs, in respect to the diagonally arriving radiation, are on both sides of the symmetry axis.

The four detection elements are ideally formed by identical thermoluminescent detection elements, e.g. lithium fluoride thermoluminescent detection elements with $^6$LiF crystals or $^7$Lif crystals. A combination of $^6$LiF crystals or $^7$Lif crystals may also be used, as stated above.

The diffuser consists ideally of a material from elements having a lower atomic number Z, ideally not larger than Z=6, i.e. carbon. Otherwise, the absorption cross-section, where applicable, is too large. For this reason, polymers are preferred, consisting exclusively of carbon and hydrogen atoms, or otherwise containing a minimal portion of higher value elements. For this purpose, (non-halogenated) polyolefins, in particular polyethylene may be used.

The diffuser has a form which is rotationally symmetrical in at least one plane crossing the card surface. Particularly preferred is a circular cylinder in the middle of which, symmetrical to the rotational symmetrical axis, the detector card is located, whereby the two pairs are mirror symmetrically configured to the axis. Other forms however are also conceivable, particularly those with a higher level of symmetry, e.g. a ball or a rounded circular cylinder. The diameter of the circular cylinder is ideally 50 mm±5 mm, which represents a good compromise between diffusion and absorption characteristics of the diffuser.

In accordance with a particularly preferred design version of the invention the diffuser is divided along the plane of the detector card in two separate halves; in the case of the circular cylinder, thereby, ideally along the axis of symmetry. At least one of the two halves, ideally both, displays a milled recess, in which the detector card is embedded, in order that it be fully enclosed by the diffusing element while in its operating state. In order that the detector card may be easily inserted and removed, the two cylinder halves can be moved in relation to each other between the open state and the closed operating state. In the closed operating state, the two halves are connected in a manner that can be released, e.g. screwed together, whereby the milled recesses form, in said state, an internal, entirely closed, chamber, in which the detector card is embedded. It is particularly preferable that the two halves are attached in a manner that they may be rotated in relation to each other on an axis perpendicular to the plane of card surface, i.e. along the cut surface between the two halves, in order that the detector card be entirely enclosed in the closed chamber of the diffuser when in the operating state, and the detector card may be inserted or removed when in the open state. If desired, the two halves may be enveloped in a protective cover when in the operating state, in order to prevent water or dirt from entering through the slit between the two halves. The protective covering should likewise consist of a plastic which is basically comprised of elements with a low Z, e.g. likewise of a polyolefin, particularly polyethylene, and be as thin as possible, in order that the measurement be influenced as little as possible, or have an appropriate window for said purpose. It is of particular importance that the diffuser not be enclosed by a metal or aluminum casing, as this would influence the results due to their absorption characteristics with photon radiation.

It is particularly preferable that the filters be attached to the inner side of the diffuser halves, at the position between which the two first detection elements of the two pairs are placed when the detector card is embedded in the hollow between the two halves while said is in the operating state. It is advantageous for the filters to remain attached to the diffuser while the detector card is being removed, as these must be removed from said in order to make a reading of the thermoluminescent chips.

The filters preferably consist of a material having an atomic number greater than or equal to 12. The Z must at least be larger than that of the diffuser in order to obtain a sufficient spectral filtering. A copper foil (Z=29) has been show to be particularly suitable, although other metals or materials may also be used.

Should copper foil be used, the ideal thickness is from 10 μm to 1000 μm, particularly ideal is between 25 μm and 100 μm. This thickness has been shown to have the optimal relationship between spectral filtering and absorption.

Should another material be used, its thickness (d) may be calculated using the following formula:

$$d = \frac{Z_{Cu}^4}{Z^4} d_{Cu} \quad (1)$$

Whereby $Z_{Cu}$ is the atomic number of copper, Z is the (where applicable, average) atomic number of the filter material, and $d_{Cu}$ lies between 10 μm and 1,000 μm, particularly preferably between 25 μm and 100 μm.

The invention comprises furthermore a process for measuring the ambient equivalent dose H*(10) of photon radiation within an energy range of 10 keV-10 MeV using an area dosimeter in accordance with the invention having the following steps:

Installation of the area dosimeter in a predetermined location having a heightened radiation level, whereby the rotation angle of the area dosimeter does not play a role, Irradiating the area dosimeter at the predetermined location with photon radiation in the energy range to be tested of 10 keV-10 MeV over the course of a certain time period, typically of a few days, weeks or months, i.e. a non-time resolved, stored measurement shall be conducted, in which the detection elements accumulate photon radiation over the course of the time period. For this, the photon radiation shall first be diffused for all of the detection elements by the enclosing diffuser, and then said radiation arriving at the first detection element, or respectively, the first detection elements of the two pairs, shall be filtered by filters located directly before and behind the first detection element, or respectively, both of the first detection elements.

Upon completion of the measurement period, the detector card is removed from the diffuser and a reading is taken using a separate reading device. For this, the first and second detection elements are read separately, and a first measurement value for the radiation dose to the first detection element and a second measurement value for the radiation dose to the second detection element are determined.

Subsequently a weighted sum is obtained from the first and second measurement values, having predefined weighting factors, whereby the weighting factors are predefined constants, which are dependant on the thickness and the material of the filters. The weighted sum $\Sigma_{GW}$ shall be preferably calculated according to the following formula:

$$\Sigma_{GW} = f_1 \cdot MW_{PE+Cu} + f_2 \cdot MW_{PE} \quad (2)$$

Whereby $MW_{PE+Cu}$ is the first measurement value, specifically the measurement value obtained by the first detection element between the (copper) filters, $MW_{PE}$ is the second measurement value, specifically the valued obtained by second detection element without filters, $f_1$ is the weighting factor for the first measurement value and $f_2$ is the weighting factor for the second measurement value. Furthermore, $f_1 + f_2 = 1$, in order that the standardization be sustainable.

The weighted sum calculated thus is subsequently used for the measurement value for the ambient equivalent dose H*(10).

In the case where the detector card is constructed with two detection pairs, all four detection elements shall be read separately in the same manner, and the two measurement values of the two first detection elements of the first and second pair shall be averaged. Furthermore, the two measurement values of the two second detection elements of the first and second pair will also be averaged. In this case, the averaged measurement values shall be used to obtain the weighted sum. This process can lead to an improvement of the directional independency of the area dosimeter.

Without claim to completeness, application fields of the area dosimeter in accordance with the invention include the measurement of gamma radiation and x-rays in linear accelerators (e.g. UNILAC by the applicant), ion sources, lasers with ultra-short laser pulses (e.g. Phelix by the applicant) as well as with ion therapy apparatuses.

In the following, the invention shall be explained in greater detail using a design version example and in reference to the drawings:

SHORT DESCRIPTION OF THE DRAWINGS

Figure 7:
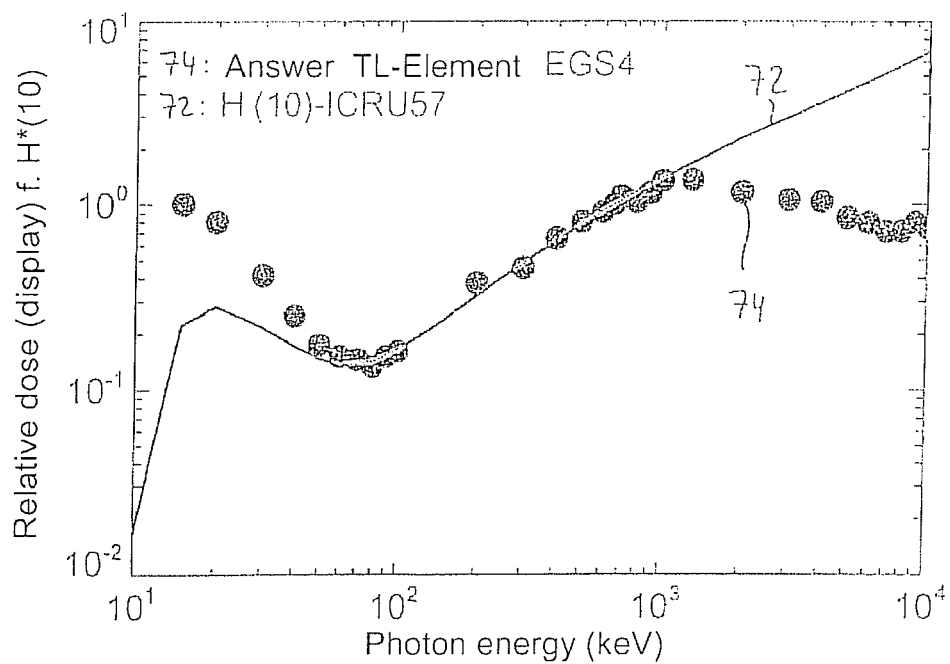
Figure 8:
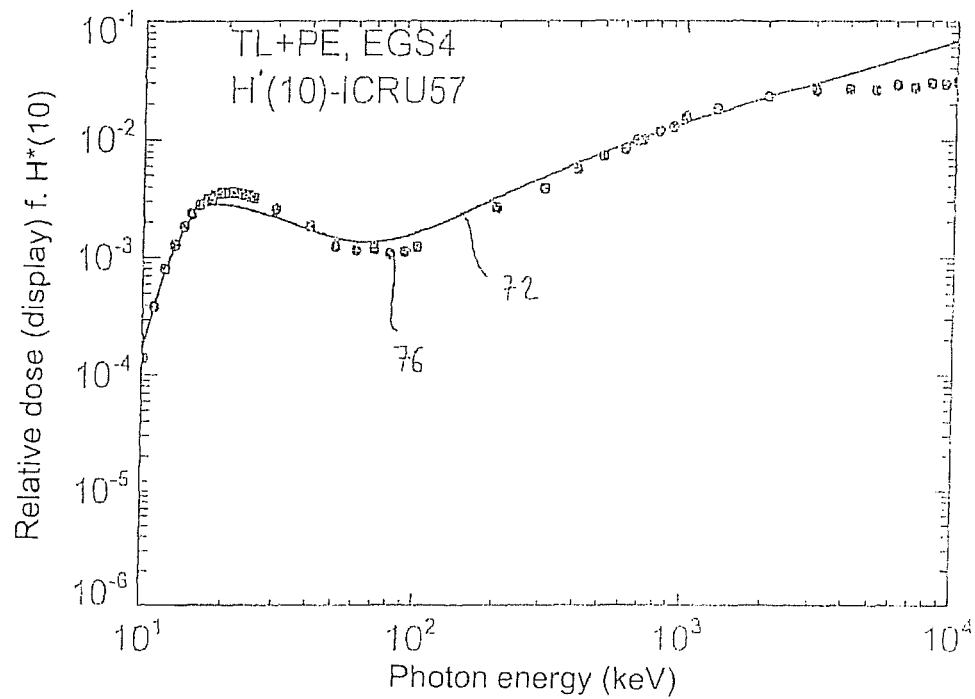
Figure 9:
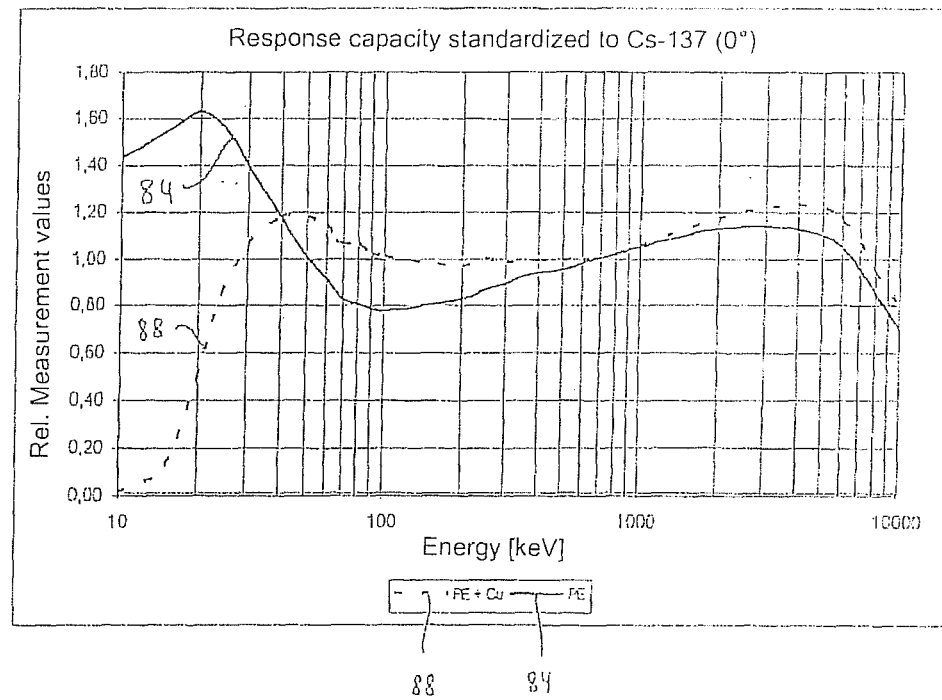
Figure 10:
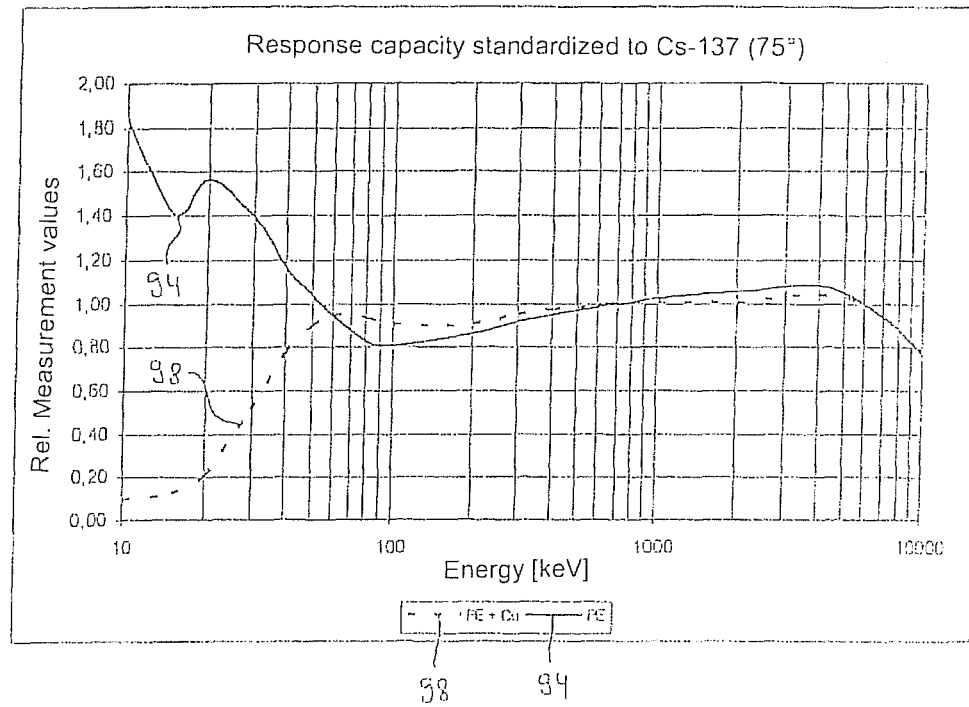
Figure 11:
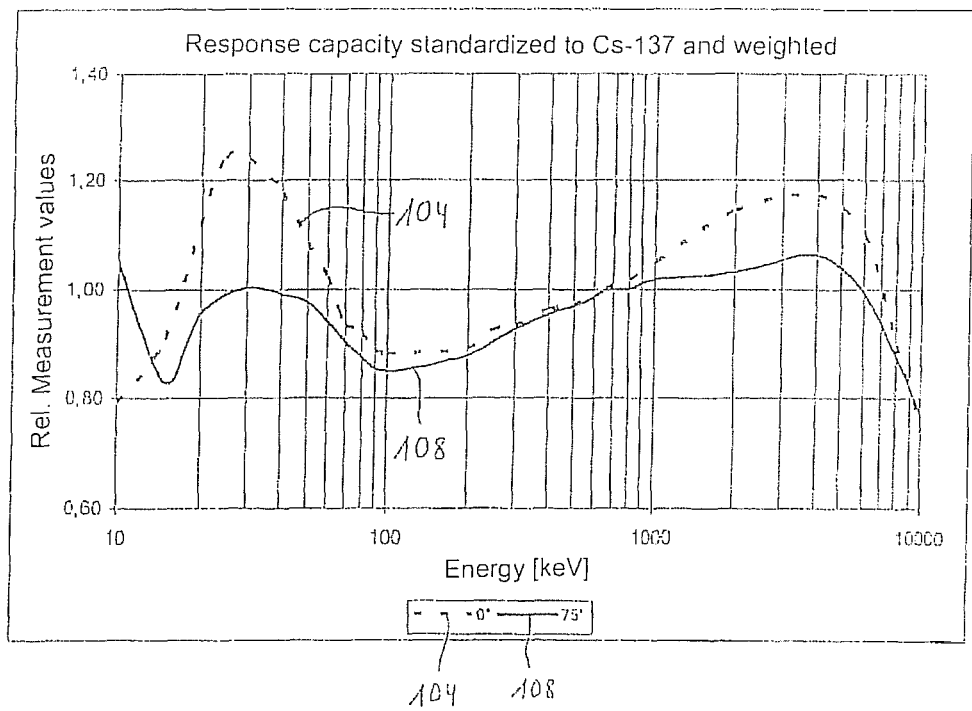

They show:

FIG. 1 A schematic presentation of a front view of a thermoluminescent detector card having four detection elements, FIG. 2 A illustration of the H*(10) ambient equivalent dosimeter in accordance with the invention with separate cylinder halves, in the completely open state, having a detector cart of type TLD 7777, FIG. 3 A schematic cross-section of the area dosimeter cut perpendicular to the card plane, FIG. 4 A schematic presentation of the two separated cylinder halves without a detector card in a front view of the internal side, FIG. 5 A schematic presentation of the two cylinder halves in the rotated opened position without a detector card, FIG. 6 A schematic cross-section of a model of the area dosimeter, visualizing the filtered and unfiltered irradiation of the first and second measurement elements of a pair, FIG. 7 The result of a simulation calculation for a TLD-chip without a diffuser, FIG. 8 The result of a simulation calculation for a TLD-chip with a diffuser, but without filters, FIG. 9 The results of a simulation calculation using the program FLUKA at an angle of 0° to the detector norm, FIG. 10 The results of a simulation calculation using the program FLUKA at an angle of 75° to the detector norm, FIG. 11 The results of a simulation calculation using the program FLUKA from the FIGS. 8 and 9 for the weighted sums at 0° and 75°.

DETAILED DESCRIPTION OF THE INVENTION

With reference to FIG. 1, the thermoluminescent detector card (TLD card) 2 displays a basically oblong rectangular shape with the following dimensions: 4.3 cm×3.1 cm×0.1 cm (length×width×height). The detector card 2 contains four lithium-7 fluoride chips ($^7$LiF) 12, 14, 22, 24 doped with magnesium and titanium as detection elements. The separate detection elements in this example are laminated in each case in PTFE foil 16 (Teflon®, trademark name from DuPont) and in each case mounted in a window 18 in an aluminum frame. The detection elements may however also be glued on one side to appropriate mounting films 16. The separate detection elements 12, 14, 22, 24 are furthermore grouped in two separated parallel pairs 10, 20, whereby the two separated detection elements of each pair 10, 20 are in each case configured above one another, in this case along the long side of the detector card 2. For purposes of precise identification each TLD card 2 has a representative barcode 4 (see FIG. 2). The cut corner 6 is used to establish the correct orientation in the magazine of the evaluation device (so-called "reader," not shown), in which the detection elements are read separately. Existing TLD cards of the type 7777 from Thermo Electron GmbH are used.

Through warming, for example by a hot nitrogen flow, or a warm finger, the free electrons sitting in the traps of the thermoluminescent crystals are newly excited, whereby they return to the valance band. In doing so, they emit photons which are detected in the reader by a photomultiplier. The frequency of the emitted photons thereby is temperature dependant, as the traps are located at different depths. By applying the photon intensity in terms of the temperature, one obtains so-called glow curves through which the photon radiation subjected to dosimetry may be determined.

Two readers type 8800 or 6600 from Harshaw and its successor Harshaw-Bicron are used. For the most part, the two readers function identically. Each contains a magazine in which the TLD card is inserted and a magazine for cards which have already been read. Both systems are equipped, in each case, with a separate computer, a printer and an integrated barcode scanner for identifying the TLD cards.

The expert in the field is familiar as a matter of principle with the use and evaluation of TLD detector cards, and therefore no further explanation is necessary here.

The TLD cards 2 with LiF-chips 12, 14, 22, 24 are suited for measurements in the energy range from 100 keV-1 MeV, when the calibration is oriented to the measurement rate of H*(10). This range however does not cover the desired low energy range below 100 KeV, which is relevant to the practice with, for example, ion sources in accelerators, in which these low energy photon radiation levels may occur.

Subsequently, a diffuser 30 made of polyethylene (PE) is used in which the detector cards 2 are embedded. The diffuser 30 delivers the necessary diffusion in order that the dosimeter 1 may be used for the low energy range as an H*(10) ambient equivalent dosimeter. It has however been determined that the use of a PE diffuser 30 alone is not yet sufficient to obtain the desired precision particularly in the range from 10 keV-30 keV.

With reference to FIG. 2, the area dosimeter 1 in accordance with the invention is shown in its fully open state. First, the present invention uses a PE diffuser 30 in the form of a cylinder, which is cut down the middle and thereby segmented in two similar cylinder halves 32a, 32b. The PE cylinder 30 has a diameter of 5 cm and a height of 6 cm. A central milling 36a, 36b in both halves 32a, 32b provides the necessary space for the TLD card 2 which is inserted in the thereby resulting recess. Using two plastic screws in the hole 42a and threaded hole 42b, the two cylinder halves may be joined in such a manner that they may separated, thereby temporarily closing the chamber formed by the two recesses. Alternatively, the PE cylinder 30 may be provided with a side insertion shaft, through which the TLD card 2 may be inserted. The area dosimeter may also be equipped with suspension bracket on the PE diffuser, thus enabling measurements to be taken in open air-space.

50 µm copper foils 52a, 52b, 62a, 62b are glued at the level of the two upper thermoluminescent chips 12, 22 of the TLD card 2 in the recesses 36a, 36b of the two cylinder halves 32a, 32b. The improved response capacity of the invention may thereby be obtained from weighted measurement values of the two TLD chip pairs 10, 20.

There are two 50 µm thick copper foils glued in the same manner to the cylinder half 32a shown on the left, which however are covered in the presentation of FIG. 2 by the TLD card 2.

With reference to FIG. 3, the detector card 2 is embedded in a central hollow 37, whereby the photon radiation arriving externally on the PE diffuser must pass through a significant distance, depending on the angle to the card norm N, of approximately 20 mm-34 mm.

With reference to FIG. 4, the filters 52a, 52b, 62a, 62b in each case are attached to the interior side 38a, 38b of each of the two diffuser halves 32a, 32b, in the respective recesses for the detector cards 36a, 36b. The filters 52a, 52b, 62a, 62b are arranged symmetrically to the symmetry axis S of the diffuser 30 in the upper half. In this manner, the two upper, first TLD chips 12, 22 in the assembled state are in each case enclosed between two copper filters 52a, 52b, or respectively, 62a, 62b, whereby the copper filters 52a, 52b, 62a, 62b completely cover both sides of the two first TLD chips 12, 22. The two lower, second TLD chips 14, 24 are not located between filters. The cut surfaces 38a, 38b and the detector card 2 form a plane of symmetry, in which the detector card 2 lies, which therefore is aligned with the card plane E. The filters 52a, 52b, 62a, 62b are arranged in each case to the left and right of the axis of symmetry on both of the cylinder halves 32a, 32b; in particular, they are symmetrical to said axis.

FIG. 5 shows the two diffuser halves 32a, 32b rotated 180° around the rotation axis relative to the operating state, thus allowing for the detector card 2 to be inserted and removed.

FIG. 6 shows a cross section (not to scale and schematic) perpendicular to the card plane E and parallel to the axis of symmetry S through the filtered first 12 and the unfiltered second TLD chip 14 of one of the two pairs of a model of the closed area dosimeter 1. The photon radiation to be subjected to dosimetry P first passes through the PE diffuser 30 common to both TLD chips 12, 14. Subsequently the radiation arrives unfiltered (aside from the PE diffuser) at the second TLD chip 14 (left) and filtered through the anterior copper filter 52a at the—in this presentation, neighboring—first TLD chip 12 (right).

In the following, simulation calculations for the dosage response capacity shall be conducted using the simulation program EGS4.

For reasons of simplification, a cylindrical model will be developed. The photon radiation sensitive detection elements are in the center of the dosimeter enveloped in the PE diffuser 30. A TLD chip 12, 14 is simulated in this example with a detection volume of 8.55 mm$^3$. The movement of the photons P is initiated from the starting energy (10 keV-10 MeV) down to energies of 5 keV. The movement of the electrons is followed up to a kinetic energy of 12 keV. The movement of the electrons is not ignored because the electrons can be removed from the effective volume of the detector. This can be compensated for in part in that electrons will be transported into the detection volume. This must, however, be precisely calculated, particularly with irradiations having higher photon energies, as the diffuser 30 and the detection elements 12, 14 are made of different materials. The signals are calculated as KERMA (: kinetic energy released in matter). The entire assessment sequence, including the heating process in gas, the light emission and the light collection of the photomultiplier is not taken into account in detail in the calculation. Only the deposited energy is used as matter for the registered signal. During the radiation transport, the deposited energy in the TLD element per primary photon is calculated and stored in a histogram. The total deposited energy per incident photon is calculated from the histogram.

For reasons of improvement on the computing efficiency, the effective volume of the simulated TLD chip is calculated with a larger volume (6.7 mm$^3$, or respectively, 8.55 mm$^3$) than with actual TLD chips 12, 14 (0.39 mm$^3$-0.91 mm$^3$). The basic energy dependency of the response capacity of the dosimeter 1 is not however represented falsely in the calculation as a result of this simplification. These calculations are standardized on the answer for the gamma radiation of a $^{137}$Cs source (661 keV).

As a reference point, first the case of the TLD elements 12, 14 without a diffuser is calculated. The result may be seen in FIG. 7.

Accordingly, FIG. 7 shows a result of the simulation calculation for the dosage response capacity. The continuous line 72 shows the standard H*(10)-ICRU57, and the points 74 show the simulated result values for the TLD chip alone, i.e. without a diffuser 30 and without filters 52a, 52b, 62a, 62b. The calculated response capacity 74 in reference to the measurement rate H*(10) is shown within the energy range of 15 keV-10 MeV. It can be seen that the simulation values 74 deviate significantly from the standard curve 72 H*(10) below 100 keV and above 1 MeV. In particular with energies smaller than 100 keV there is an overestimation of up to a magnitude of two, whereby for energies greater than 1 MeV there is an underestimation of the dose with increases of energy.

FIG. 8 shows the result of the simulation calculation for a TLD chip 14 with a PE diffuser 30 having a radius of 24.0 mm (0.92 g/cm³) and the TLD chip 14. The simulation values are labeled as 76. For the energy range of 10 keV-approx. 2 MeV a relatively good conformance to the progression of the relative dosage conversion function for H*(10), labeled as 72, is already obtained for the response capacity.

It should however be noted that there is still a dosage overestimation in the energy range from approx. 20 keV-40 keV. Above approx. 3 MeV there is an underestimation of the dosage indication, less so, however, than with the TLD chip without a diffuser. It should be noted that the deviations seem relatively small due to the doubled logarithmic representation in FIG. 8, but still indicate an insufficient measurement precision. These deviations can be improved with the invention.

For the second simulation, improved simulation calculations are conducted using the program FLUKA and verified through experimental test measurements. The results of the simulation calculations are presented in the FIGS. 9-11.

FIG. 9 shows the results of the FLUKA computations 84, 88 at 0°, i.e. parallel to the standard N of the detector card 2. On the Y-axis, the relative response capacity, standardized to Cs-137, is shown as a function of the energy of the photon radiation (X-axis). The calculations are carried out in each case for the TLD chip in the PE diffuser 30, once with and once without copper filters (50 µm) 52a, 52b, 62a, 62b. Here too, on the curve 84 without filters, over amplification in the energy range below approx. 40 keV can be observed which at the maximal point of approx. 20 keV is increased by more than a factor of 1.6. In contrast to this, the curve 88 with copper filters shows a significant underestimation in the energy range below 40 keV. The filters suppress therefore the relative response capacity in the range of lower photon energies in comparison with larger photon energies, whereby the suppression begins at a "border energy" $E_x$ of the photons. The border energy $E_x$ should lie between 15 keV and 100 keV. In this example $E_x \approx 30$ keV. This means that the filters are to be selected such that the relative response capacity of the filtered TLD chip 12 is in the range between the border energy $E_x$ and at least the Cs-137 standard value runs relatively flat and below the border energy $E_x$ drops off significantly.

FIG. 10 shows corresponding results to FIG. 9, but at an angle of 75° to the standard of the detector card. Here too, for the values 94 without copper filters, there is a significant over amplification to be observed at less than 40 keV, which is nearly 100% at 10 keV. The values 98 with copper filters show a somewhat flatter progression than at 0°.

In accordance with the invention, the values of the simulation calculation with copper filters 88 and respectively 98 ($MW_{PE+CU}$) and the values of the simulation calculation without copper filters 84 and respectively 94 ($MW_{PE}$) whereby a weighted sum shall be obtained using the following equation:

$$\Sigma_{GW} = 0.45 \cdot MW_{PE+Cu} + 0.55 \cdot MW_{PE} \quad (3)$$

Whereby the weighting factors are $f_1 = 0.45$ and $f_2 = 0.55$.

FIG. 11 shows the resulting curves of the test results from FIGS. 9 and 10 using the weighted sums calculated according to equation (3), i.e. both for an angle of 0° to the standard N (reference number: 104) as well as for an angle of 75° to the standard N (reference number: 108). The weighted sums may also be referred to as "weighted response capacities" of the area dosimeter in accordance with the invention. Accordingly, the Y-axis shows the relative, weighted response capacity, standardized to Cs-137 as a function of the energy of the photon radiation (X-axis) for 0° 104 and for 75° 108.

It can be seen that the weighted response capacity 104 at 0° within the entire energy range between 10 keV and approx. 3 MeV deviates from the standard a maximum of approx. 25% and particularly in the energy range less than 30 keV displays a significantly smaller deviation than in the curve 84 with a PE diffuser but without filters in FIG. 9.

In reference to the results 108 at 75° an even greater precision can be observed. The deviation at 75° is less than 10% between 20 keV and 40 keV and between 10 keV and 20 keV is less than 20%.

The spectral filtering effect of the filters is selected accordingly such that the standardized and weighted response capacity of the two detection elements 12, 14 of a pair 10 (with correspondingly adjusted weighting factors) at least in the range from 10 keV-30 keV remains closer (ideally with a deviation of less than 30% for certain angles, e.g. 0° and/or 75°) than the relative response capacity of the second detection elements 14 without filters 52a, 52b, i.e. having only a diffuser 30.

It is clear that the measurement in a test experiment can only be executed at selected angles. In actual operating conditions all angles are measured simultaneously and not differentiated, such that the area dosimeter 1 should enable a precise measurement at all angles from 0°-360°. The test results show that the invention in regard to this shows preferences compared to an exclusive measurement with only a PE diffuser 30.

In summary, it can be claimed that the conventional dosimeter LiF-chip cards 2 are suited for correctly measuring the radiation in an energy range from 100 keV-1 MeV, when the calibration is obtained in terms of the measurement rate of H*(10) 72. Should the dosimeter be used with radiation sources for x-rays, it may however in some cases be assumed that a significant portion of the total dose is the result of photons having an energy of less than 30 keV. The use of a PE diffuser however will also not result in this case in the desired precision. Furthermore, with an accelerator there is frequently a total radiation with energies greater than 1.3 MeV. The area dosimeter 1 of the invention is capable of measuring x-rays and gamma radiation in these energy ranges with improved precision as well. For this purpose, in addition to the diffuser, spectral filters 52a, 52b, 62a, 62b in front of and behind the first TLD chips 12, 22 are implemented. The diffuser 30 consists of polyethylene, having a coating thickness (cylinder radius) of at least 24 mm over the chips. The filters 52a, 52b, 62a, 62b are, for example, made of 50 µm thick copper foil and covers in each case only one TLD chip 12, 22 of each TLD chip pair 10, 20, such that said TLD chip 12, 22 displays a lesser response capacity, particularly with smaller photon energies. The weighted summing of the measurement values of both TLD chips 12, 14, or respectively 22, 24 of each pair provides thereby an optimized response capacity.

The invention claimed is:

1. An area dosimeter (1) for measuring the ambient equivalent dose (H*(10)) of photon radiation (P) including:
    a scattering body (30) for the photon radiation (P),
    a detector card (2) with at least one first pair (10) of photon radiation sensitive detection elements (12, 14) having identical response characteristics for the photon radiation to be measured (P),
    wherein the detector card (2) defines a card plane (E), and the two detection elements (12, 14) are arranged next to or above each other on the card plane (E) of the detector card (2), and wherein the arrangement of the scattering body (30) and the detection elements (12, 14) is constructed such that it is basically mirror symmetric to the card plane (E), such that the two detection elements (12, 14) for photon radiation are sensitive in the same manner from both sides of the card plane (E), in order that a measurement of the photon radiation (P) may be obtained in a range of almost 360°,
    wherein the first (12) of the two detection elements is positioned between two filters (52a, 52b) such that the photon radiation (P) arriving at the first detection element (12) is filtered either from the one (52a) filter or the other (52b) filter, depending on whether the photon radiation (P) arrives at the first detection element (12) from the front or the back, wherein the two filters (52a, 52b) are identical in respect to their spectral filtering effect, in order that the same spectral filtering effect be obtained from the front and from the back,
    wherein the second of the two detection elements (14) is not placed between such filters (52a, 52b) as is the case with the first detection element (12), in order that the photon radiation (P) arriving at the second detection element (14) displays a different spectral distribution than the spectrally filtered photon radiation (P) arriving at the first detection element (12),
    wherein the detector card (2) has a second pair (20) of photon radiation sensitive detection elements (22, 24) which are identical to the first pair (10),
    wherein the first of the two detection elements (22) of the second pair (20) is positioned between two filters (62a, 62b) such that the photon radiation (P) arriving at the first detection element (22) of the second pair (20) is filtered either from one (62a) or the other (62b) filter, depending on whether the photon radiation (P) arrives at the first detection element (22) of the second pair (20) from the front or the back, wherein the two filters (62a, 62b) of the first detection element (22) of the second pair (20) are constructed identically in respect to their spectral filtering effect in order that photon radiation (P) receives the same spectral filtering effect from the front and from the back, and whereby the filters (62a, 62b) of the first detection element (22) of the second pair (20) and the filters (52a, 52b) of the first detection element (12) of the first pair (10) are constructed identically in respect to their spectral filtering effect, and
    wherein the second (24) of the two detection elements of the second pair (20) is not located between such filters (62a, 62b) as is the case with the first detection element (22) of the second pair (20) such that the photon radiation (P) arriving at the second detection element (24) of the second pair (20) displays a different spectral distribution than the spectrally filtered photon radiation (P) arriving at the first detection element (22) of the second pair (20).

2. An area dosimeter (1) in accordance with claim 1, wherein the detection elements (12, 14, 22, 24) are thermoluminescent detection elements.

3. An area dosimeter (1) in accordance with claim 2, wherein the detection elements (12, 14, 22, 24) are lithium fluoride crystal thermoluminescent detection element.

4. An area dosimeter (1) in accordance with claim 1, wherein the scattering body (30) is made of a plastic which in essence consists of only carbon and hydrogen atoms.

5. An area dosimeter (1) in accordance with claim 4, wherein the scattering body (30) is made of a polyolefin.

6. An area dosimeter (1) in accordance with claim 1, wherein the scattering body (30) is rotation symmetrical in at least one plane crossing the plane of the card plane (E).

7. An area dosimeter (1) in accordance with claim 6, wherein the first and second pair (10, 20) detection elements (12, 14, 22, 24) are arranged mirror symmetrically to the axis of the cylinder (S).

8. An area dosimeter (1) in accordance with claim 6, wherein the scattering body (30) has a diameter of 50 mm±5 mm.

9. An area dosimeter (1) in accordance with claim 1, wherein the scattering body (30) is divided in two halves (32a, 32b) along the card plane (E), wherein the two halves (32a, 32b) may be moved in relation to each other between an open state and a closed operating state, wherein the two halves (32a, 32b) are connected to each other in a manner which may be released when in the closed operating state, and form an internal chamber, in which the detector card (2) is embedded and wherein the detector card (2) is adapted to be inserted and removed when the scattering body is in the open state.

10. An area dosimeter (1) in accordance with claim 9, wherein the two halves (32a, 32b) are connected such that they may be rotated on an axis perpendicular to the card plane (E) and may be rotated in relation to each other between the open state and the closed operating state, in order that the detector card (2) may be enclosed on all sides within the chamber of the scattering body when in the operating state, and the detector card (2) is adapted to be inserted and removed when in the open state.

11. An area dosimeter (1) in accordance with claim 9, wherein the two filters (52a, 52b) in each case are attached at positions on one of the two halves (32a, 32) between which the first detection element (12) shall be located embedded in the chamber between the two halves (32a, 32b) when it is in the operating state.

12. An area dosimeter (1) in accordance with claim 9, wherein the two halves (32a, 32b), when in the operating state, are surrounded by a protective casing which is essentially not effective spectrally.

13. An area dosimeter (1) in accordance with claim 12, wherein the protective casing is made of plastics.

14. An area dosimeter (1) in accordance with claim 1, wherein the scattering body (30) is not encased in a metal housing.

15. An area dosimeter (1) in accordance with claim 1, wherein the filters (52a, 52b, 62a, 62b) are made of a material having an atomic number greater than or equal to 12.

16. An area dosimeter (1) in accordance with claim 15, wherein the filters (52a, 52b, 62a, 62b) have a thickness d which is calculated according to the formula $$d = \frac{Z_{Cu}^4}{Z^4} d_{Cu},$$

wherein $Z_{Cu}$ is the atomic number of copper, Z is the atomic number of the filter material, and $d_{Cu}$ is between 10 μm and 1,000 μm.

17. An area dosimeter (1) in accordance with claim 1, wherein the filters (52a, 52b, 62a, 62b) are metal foils.

18. An area dosimeter (1) in accordance with claim 17, wherein the filters (52a, 52b, 62a, 62b) are copper foils.

19. An area dosimeter (1) in accordance with claim 18, wherein the copper foils have a thickness of d which is between 10 μm and 1,000 μm.

20. A process for measuring the ambient equivalent dose (H*(10)) of photon radiation (P) in an energy range of 10 keV-10 MeV using an area dosimeter (1), in particular in accordance with any of the previous claims, which includes:
    installing the area dosimeter (1) at a predetermined location exposed to radiation, wherein the area dosimeter (1) contains a scattering body (30) for the photon radiation (P) and a detector card (2) with at least one pair (10) of photon radiation sensitive detection elements (12, 14) having identical response characteristics for the photon radiation (P) to be measured located within the scattering body (30), wherein the first (12) of the two detection elements is positioned between to filters (52a, 52b),
    irradiating the area dosimeter (1) at the predetermined location with photon radiation (P) in the energy range of at least 10 keV-10 MeV over the course of a certain time period, wherein the photon radiation (P) arriving at the first detection element (12) is filtered by the filters (52a, 52b) arranged in front of and behind the first detection element (12),
    making a reading of the area dosimeter (1) after the period of irradiation, wherein the first and second detection elements (12, 14) are read separately, and a first measurement value for the radiation dose to the first detection element (12) and a second measurement value for the radiation dose to the second detection element (14) are determined,
    forming a weighted sum $\Sigma_{GW}$ from the first and second measurement values, with predefined weighting factors $f_1$, $f_2$, which are dependent on the thickness of the material of the filters (52a, 52b),
    wherein the weighted sum $\Sigma_{GW}$ is calculated according to the following formula: $\Sigma_{GW}=f_1 \cdot MW_{PE+Cu}+f_2 \cdot MW_{PE}$, whereby $MW_{PE+Cu}$ is the first measurement value, $MW_{PE}$ is the second measurement value, $f_1$ is the weighting factor for the first measurement value and $f_2$ is the weighting factor for the second measurement value and whereby $f_1+f_2=1$ and the weighting factors $f_1$ and $f_2$ are dependant on the thickness and the material of the filters (52a, 52b), and
    using the weighted sum as a measurement value for the ambient equivalent dose H*(10).

21. A process in accordance with claim 20, wherein the detector card (2) contains a second pair (20) of photon radiation sensitive detection elements (22, 24) having the same response characteristics of the photon radiation (P) to be measured, wherein the first (22) of the two detection elements of the second pair (20) is positioned between two filters (62a, 62b),
    making a reading of the area dosimeter (1) following the time period of the irradiation, whereby the first and second detection elements (12, 14) of the first pair (10) and the first and second detection elements (22, 24) of the second pair (20) in each case are read separately, the first measurement value is obtained by averaging the two measurement values of each of the first detection elements (12, 22) of the first and second pairs (10, 20), and the second measurement value is obtained by averaging the two measurement values of each of the second detection elements (14, 24) of the first and second pairs (10, 20) and
    wherein the weighted sum is obtained from the first and second averaged measurement values obtained thereby.

22. A process in accordance with claim 21, wherein the weighted sum $\Sigma_{GW}$ is calculated according to the following formula: $\Sigma_{GW}=f_1 \cdot MW_{PE+Cu}+f_2 \cdot MW_{PE}$, wherein $MW_{PE+Cu}$ is the first averaged measurement value, $MW_{PE}$ is the second averaged measurement value, $f_1$ is the weighting factor for the first averaged measurement value and $f_2$ is the weighting factor for the second averaged measurement value and wherein $f_1+f_2=1$ and the weighting factors $f_1$ and $f_2$ are dependant on the thickness and the material of the filters (52a, 52b).

23. An area dosimeter (1) for measuring the ambient equivalent dose (H*(10)) of photon radiation (P) including:
    a scattering body (30) for the photon radiation (P),
    a detector card (2) with at least one first pair (10) of photon radiatioin sensitive detection elements (12, 14) having identical response characteristics for the photon radiation to be measured (P),
    wherein the detector card (2) defines a card plane (E), and the two detection elements (12, 14) are arranged next to or above each other on the card plane (E) of the detector card (2), and wherein the arrangement of the scattering body (30) and the detection elements (12, 14) is constructed such that it is basically mirror symmetric to the card plane (E), such that two detection elements (12, 14) for photon radiation are sensitive in the same manner from both sides of the card plane (E), in order that a measurement of the photon radiation (P) may be obtained in a range of almost 360°,
    wherein the first (12) of the two detection elements is positioned between two filters (52a, 52b) such that the photon radiation (P) arriving at the first detection element (12) is filtered either from the one (52a) filter or the other (52b) filter, depending on whether the photon radiation (P) arrives at the first detection element (12) from the front or the back, wherein the two filters (52a, 52b) are identical in respect to their spectral filtering effect, in order that the same spectral filtering effect be obtained from the front and from the back,
    wherein the second of the two detection elements (14) is not placed between such filters (52a, 52b) as is the case with the first detection element (12), in order that the photon radiation (P) arriving at the first detection element (12),
    wherein the detector card (2) is embedded in the scattering body and wherein the scattering body (30) has a rotation-symmetric form in at least one plane transverse to the card plane (E).

* * * * *

UNITED STATES PATENT AND TRADEMARK OFFICE
CERTIFICATE OF CORRECTION

| | |
|---|---|
| PATENT NO. | : 8,416,401 B2 |
| APPLICATION NO. | : 12/741990 |
| DATED | : April 9, 2013 |
| INVENTOR(S) | : Georg Fehrenbacher et al. |

It is certified that error appears in the above-identified patent and that said Letters Patent is hereby corrected as shown below:

Title page after Item (73) Assignee: GSI Helmholtzzentrum fur Schwerionenforschung GmbH (DE), should read:

On the Title Page:

The first or sole Notice should read --

Subject to any disclaimer, the term of this patent is extended or adjusted under 35 U.S.C. 154(b) by 177 days.

Signed and Sealed this
Third Day of September, 2013

Teresa Stanek Rea
*Acting Director of the United States Patent and Trademark Office*